Patented June 22, 1943

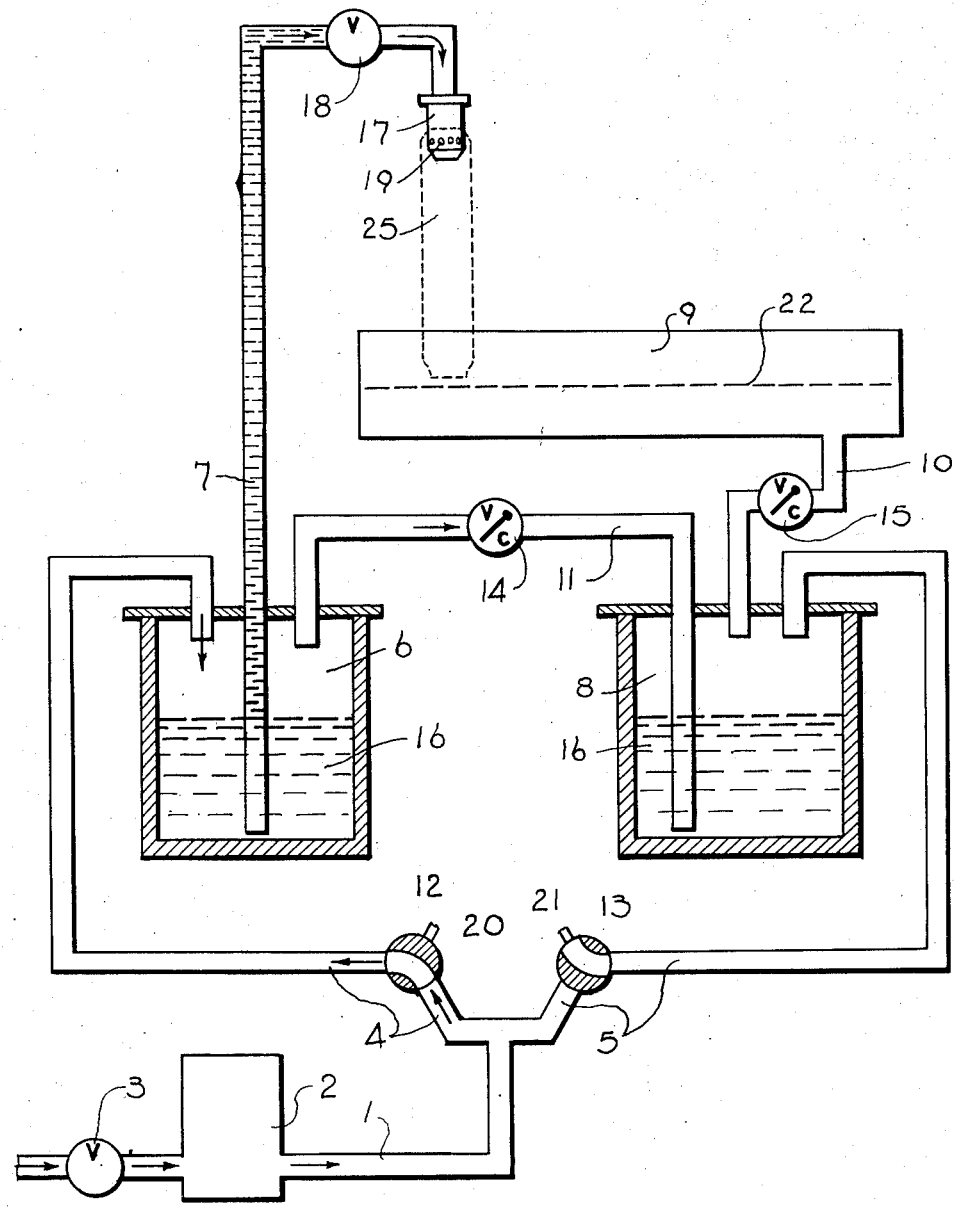

2,322,729

UNITED STATES PATENT OFFICE 2,322,729

COATING APPARATUS FOR GASEOUS DISCHARGE LAMPS

George E. Holman, Melrose, Mass., assignor to Sylvania Electric Products Inc., a corporation of Massachusetts Application March 22, 1941, Serial No. 384,765

1 Claim. (Cl. 91—43)

This invention relates to the manufacture of fluorescent lamps and more particularly to apparatus employed in applying a coating of luminescent material to the inner walls of said lamps.

An object of this invention is to provide apparatus for coating the inner walls of a tubular glass envelope.

Another object is to provide an apparatus of this type which will protect the coating solution from foreign impurities.

A further object is to provide an apparatus of this type which will provide a means for directing the excess solution drained from the tubular glass envelope into the original coating solution container.

Further objects, advantages and features will be apparent from the following specification taken in conjunction with the accompanying drawing in which the figure of the drawing is a schematic diagram of the apparatus of my invention.

One of the well known methods of applying a coating of luminescent material to the inner walls of a glass envelope is to flush the tube or bulb by forcing the solution up into it from the bottom while it is held in a vertical position. However, I have found that many foreign substances and impurities gradually contaminate the coating solution when this method is used. This is caused by reason of the fact that the excess solution which flows back into the solution container often times carries with it foreign substances and impurities from the walls of the glass over which it has been caused to flow.

I have, therefore, employed a spraying method whereby the coating solution is introduced into the glass envelope from the top thereof and caused to flow downward over the walls of the tube or bulb. The excess which flows off from the bottom of the tube or bulb drains off into a trough. This trough has an elongated filter arranged therein. The solution thus purified flows from the trough into a solution container. This container, which recovers the excess solution from the tubes or bulbs which have been coated, is connected to the container from which the solution was initially drawn to spray the bulbs. In this manner a continuous supply of coating solution, free from foreign substances and impurities, is insured.

The air line 1 is connected to a source of air supply. The pressure regulator 3 on the line 1 serves to insure an accurate pressure control. The air filter 2, also on the air line 1, serves to purify the air of all foreign substances and impurities before the air comes in contact with the coating solution. Air lines 4 and 5 lead off from the inner end of air line 1. Valves 12 and 13 on lines 4 and 5 respectively control the flow of air from line 1 into the main solution container 6 and the solution recovery container 8 respectively.

When bulbs or tubes are to be sprayed with the coating solution, the valve 13 on line 5 is closed and the valve 12 on line 4 is opened. Air passes from line 1 through line 4 into the main solution container 6 containing the luminescent coating solution 16. This flow of air is under sufficient pressure to force the solution 16 up into the line 7 which is connected to the spraying nozzle 17 through the valve 18. When the bulb 25 is placed up into spraying position with the upper end of the bulb encircling the vents 19 in the nozzle 17, the valve 18 is opened and as a result the solution 16 is sprayed on the inner walls of the bulb 25. When a quantity of solution sufficient to coat the bulb has been permitted to flow through the valve 18, the valve is closed until another bulb has been placed in the spraying position.

The excess solution drains off into the trough 9 through the filter 22. It then flows through the line 19 and the check valve 15 into the solution recovery container 8.

When most of the solution in the main solution container 6 has been used up, the apparatus of my invention provides a ready means for transferring the purified, recovered solution from the container 8 into the container 6. By closing the valve 12 on the line 4 and opening the valve 13 on the line 5, the air from the air line 1 is caused to flow through line 5 into the solution recovery container 8 to force the solution in this container up through line 11, and the check valve 14 thereon, into the main solution container 6. Thus in this manner the solution is transferred without the danger of foreign substances and impurities contaminating the solution during the transferring process. When the transfer has been completed, the valve 13 may be closed, the valve 12 opened and the spraying operation resumed.

The check valves 14 and 15 are arranged as shown in the accompanying drawing and thus insure the proper control at all times during the operation of the apparatus. Thus when air is caused to flow through line 4, there is no danger of the solution in container 6 flowing into container 8 through line 11 because the check valve permits a flow from container 8 to container 6 but not vice versa. For a similar reason, there is no danger of the solution in the recovery container 8 being forced back up into the trough 9 because the check valve 15 is arranged to permit a flow through line 10 from the trough 9 to container 8 but not vice versa.

The vents 20 and 21 on the valves 12 and 13 respectively provide an outlet for such air as is locked in the lines 4 and 5 and the containers 6 and 8 when said lines are closed off from the air flowing therethrough from line 1.

What I claim is:

In apparatus for applying a coating of luminescent material solution to the walls of an elongated glass envelope, the combination; a source of air pressure; a coating solution container in communication with said source; means for directing said coating solution on to the walls of said glass envelope at the top only of said envelope so that the solution may drain down over the inside walls over said envelope to coat the same, said means being in communication with said container; a trough in drainage relationship to said elongated glass envelope; a filter in said trough; a recovery container; a check valve; means for connecting said recovery container to said filtering trough through said check valve; a second check valve; means for connecting said recovery container to said first mentioned container through said second check valve; means for connecting said source of air under pressure to said recovery container; means for closing said first mentioned container from said air source when said recovery container is connected to said air source; and means for closing said recovery container from said air source when said first mentioned container is connected to said air source.

GEORGE E. HOLMAN.